F. F. WORTHEN.
MECHANISM FOR AUTOMATICALLY CONTROLLING ELEVATOR CARS.
APPLICATION FILED MAR. 1, 1916.
1,219,061.
Patented Mar. 13, 1917.
5 SHEETS—SHEET 1.
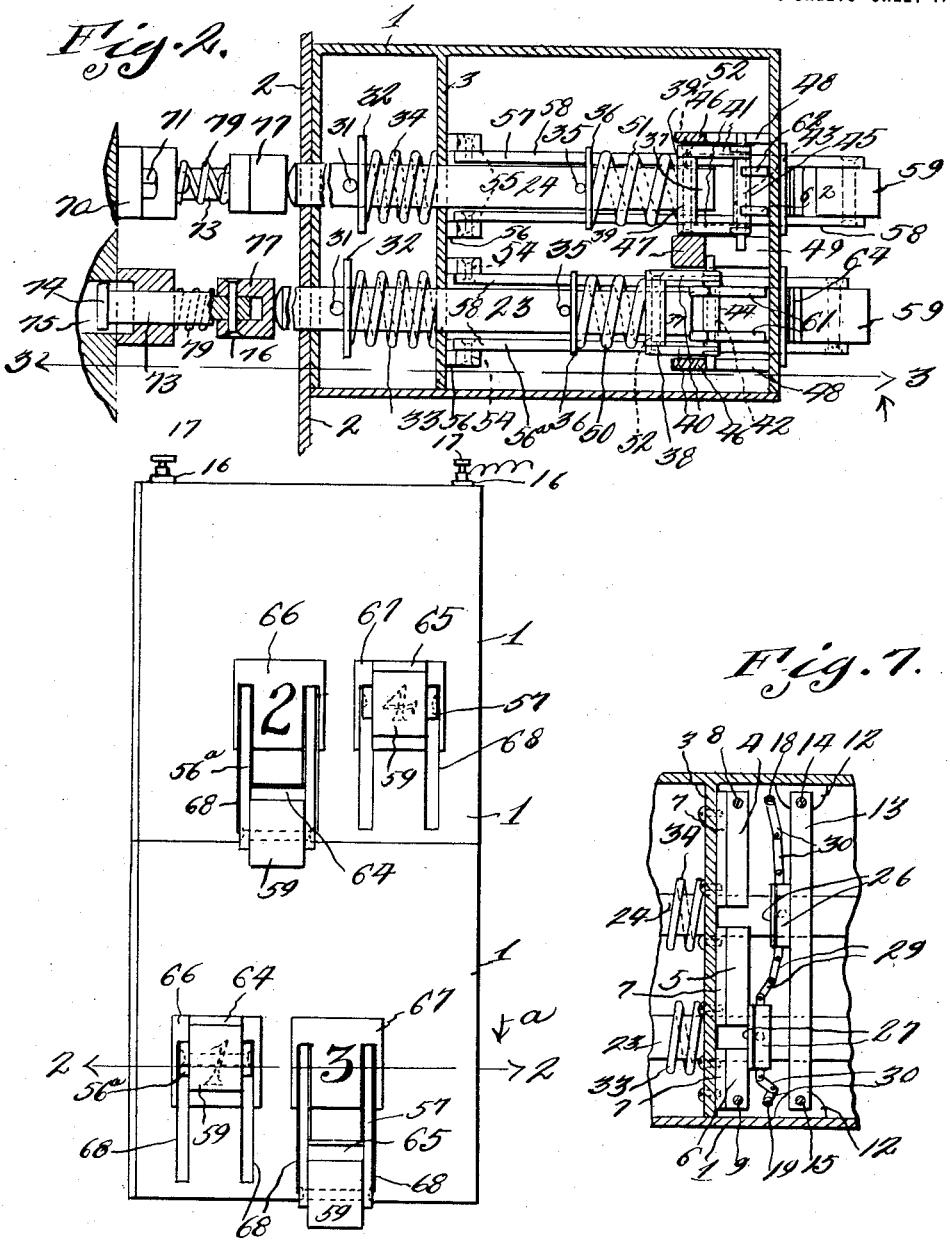

F. F. WORTHEN.
MECHANISM FOR AUTOMATICALLY CONTROLLING ELEVATOR CARS.
APPLICATION FILED MAR. 1, 1916.

1,219,061.

Patented Mar. 13, 1917.
5 SHEETS—SHEET 2.

Witnesses

Inventor
F. F. Worthen
By D. Swift & Co.
his Attorneys

F. F. WORTHEN.
MECHANISM FOR AUTOMATICALLY CONTROLLING ELEVATOR CARS.
APPLICATION FILED MAR. 1, 1916.
1,219,061.
Patented Mar. 13, 1917.
5 SHEETS—SHEET 3.
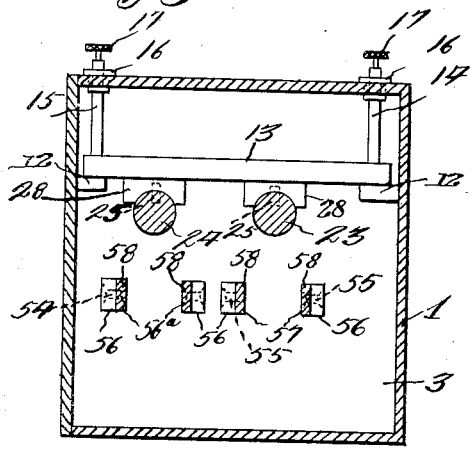
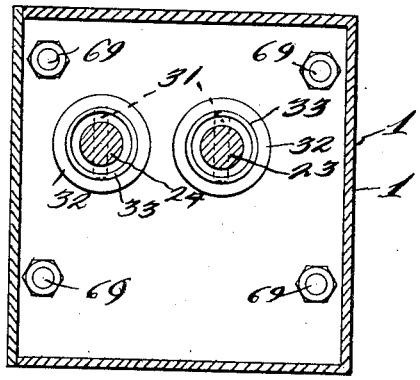
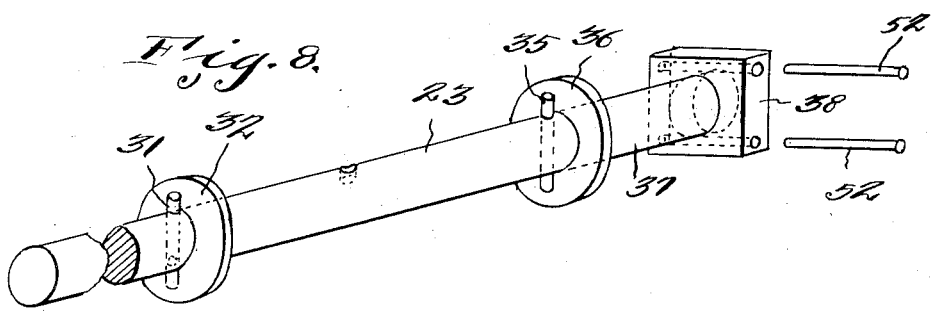
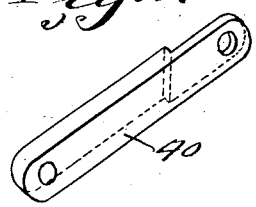
Inventor
F. F. Worthen
By D. Swift & Co.
his Attorneys F. F. WORTHEN.
MECHANISM FOR AUTOMATICALLY CONTROLLING ELEVATOR CARS.
APPLICATION FILED MAR. 1, 1916.
1,219,061.
Patented Mar. 13, 1917.
5 SHEETS—SHEET 4.
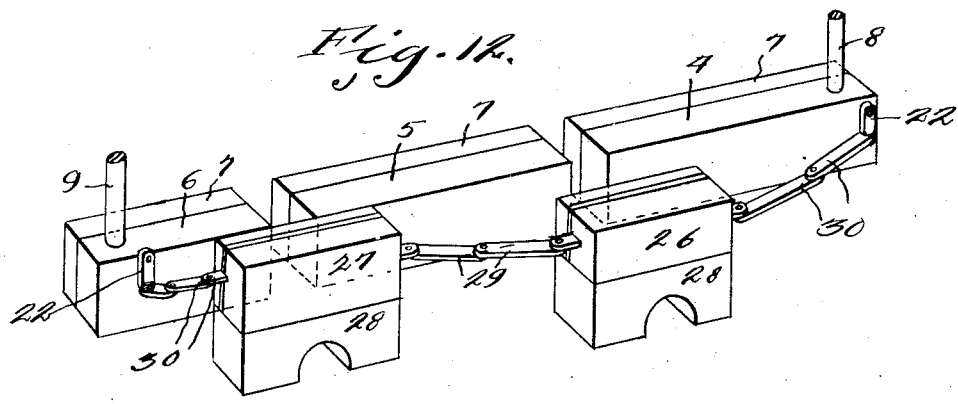
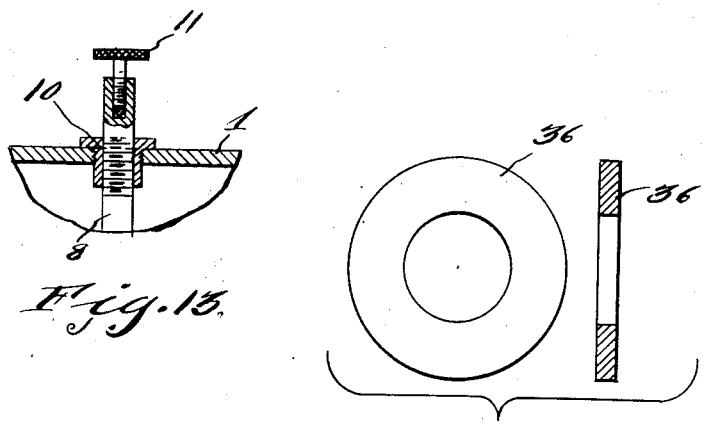

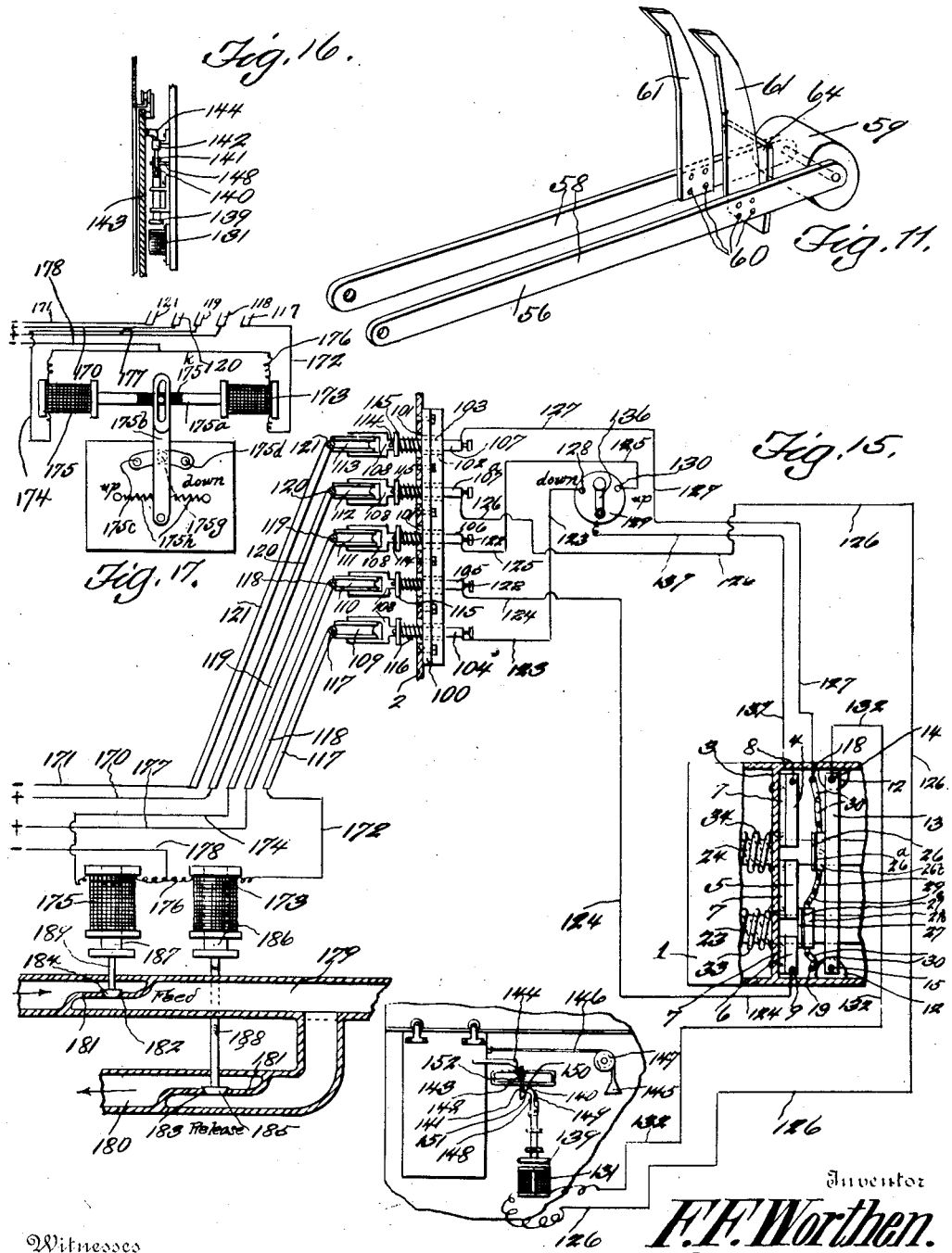

UNITED STATES PATENT OFFICE.

FRANK FAYETTE WORTHEN, OF PIERMONT, NEW HAMPSHIRE.

MECHANISM FOR AUTOMATICALLY CONTROLLING ELEVATOR-CARS.

1,219,061. Specification of Letters Patent. Patented Mar. 13, 1917.

Application filed March 1, 1916. Serial No. 81,437.

*To all whom it may concern:*

Be it known that I, FRANK FAYETTE WORTHEN, a citizen of the United States, residing at Piermont, in the county of Grafton, State of New Hampshire, have invented a new and useful Mechanism for Automatically Controlling Elevator-Cars; and I do hereby declare the following to be a full, clear, and exact description of the invention, such as will enable others skilled in the art to which it appertains to make and use the same.

This invention relates to an improved mechanism for automatically controlling elevator cars, and an object of the invention is to provide a device of this nature, which is simple, efficient and practical in construction, and inexpensive to manufacture, and comprises improved features of construction, whereby the elevator car is in positive control.

Another object of the invention is the provision of a control box on the cage having means to be actuated and thrown in circuit with means adjacent the wall of the elevator shaft, whereby the cage may stop at predetermined floors, when the cage is ascending or descending.

Another object of the invention is the provision of an improved control box having means for operation by an employee upon one floor of a packing house or the like, in which freight elevators are more especially adapted for use, whereby said employee may send the elevator car to any other desired floor, and vice versa.

Another object of the invention is the provision of a control box having means, whereby the next stopping place is disclosed to the operator, or other person, upon entering the car.

In practical fields the details of construction may necessitate alterations, falling within the scope of what is claimed.

The invention comprises further features and combination of parts, as hereinafter set forth, shown in the drawings and claimed.

In the drawings:

Figure 1 is a view in front elevation of the improved control box.

Fig. 2 is a sectional view on line 2—2 of Fig. 1 looking downwardly in the direction of the arrow *a*.

Fig. 5 is a sectional view on line 5—5 of Fig. 3.

Fig. 6 is a sectional view on line 6—6 of Fig. 3.

Fig. 7 is a detail plan view of a portion of the control box, showing the coöperating electrodes, whereby the circuit may be made and broken.

Fig. 8 is a detail perspective view of one of the plunger rods or bolts of the control box.

Fig. 9 is a detail view of a link, which is connected to a collar of the plunger rod.

Fig. 10 is a detail perspective view of the pin, to which the links of the collar of one of the plunger rods or bolts are connected.

Fig. 11 is an enlarged detail perspective view of one of the actuating levers of the control box.

Fig. 12 is an enlarged detail perspective view of the coöperating electrodes, which are shown in Fig. 7.

Fig. 13 is a detail view of one of the binding posts of the control box.

Fig. 14 illustrates sectional and plan views of one of the spring abutment washers of the plunger rods.

Fig. 15 is a diagrammatic view of the circuits to the control box.

Fig. 16 is a view partly in section and partly in elevation of the door operating mechanism, at right angles to that shown in Fig. 15.

Fig. 17 is a detail view showing how the magnets 173 and 175 may be connected to actuate a conventional form of an electric switch of an electrically operated elevator.

Figure 3:
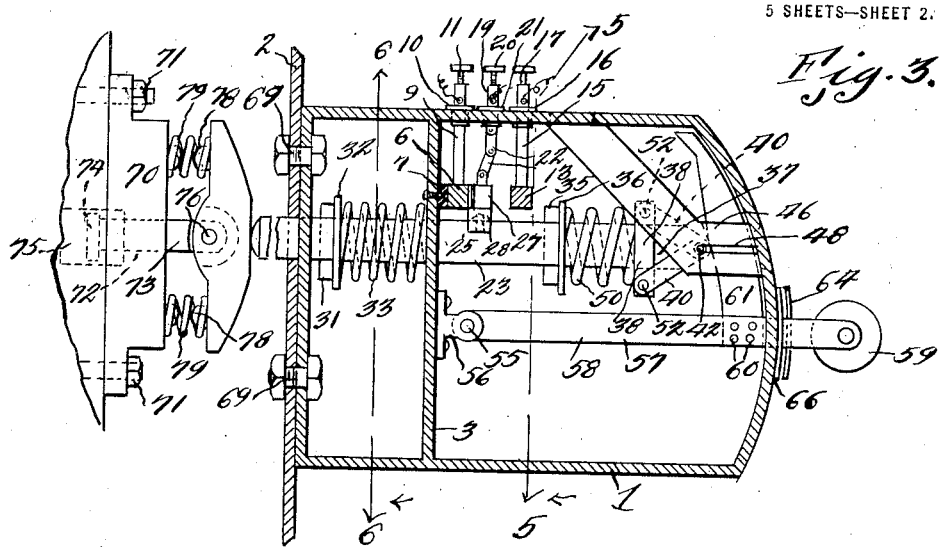
Fig. 3 is a sectional view on line 3—3 of Fig. 2, showing one of the controlling levers of the control box so operated that an element thereon is holding a plunger rod, so that its terminal electrode is in contact with similar electrodes, to maintain the circuit closed, thereby preventing the car from being stopped at a floor or landing.
Figure 4:
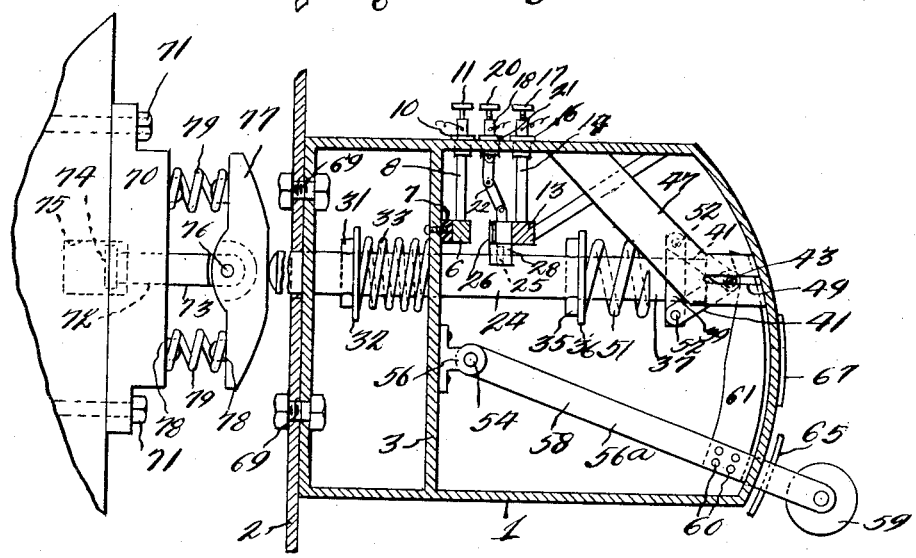
Fig. 4 is a similar view to Fig. 3, illustrating the controlling lever as having been moved, so that when the car reaches a certain floor, a member on said car will contact with a plunger rod to actuate the same, to cause the terminal electrodes of the plunger rod to disengage similar electrodes, to break the circuit, to cause the car to stop at a predetermined floor or landing.

Referring more especially to the drawings, 1 designates the casing of the control box, which is designed to be carried by the elevator car on the interior thereof, and a portion of which car is shown at 2, and which casing may be any desired shape or configuration, and constructed from any suitable material. The casing is provided with a partition 3, to one face of which the contact electrode strips 4, 5 and 6 are secured by the insulating means 7. The electrode members 4 and 6 have binding posts 8 and 9, which rise upwardly through the top of the casing, there being insulation 10 in the upper wall of the casing and surround the binding posts, which are provided with the usual thumb screws 11 for connecting the wires or leads. Connected to the opposite sides of the casing by means of the ears 12 is an electrode member 13, which is arranged at a spaced interval from and in parallelism with the electrodes 4, 5 and 6. The opposite ends of the electrode member 13 are provided with binding posts 14 and 15, which also extend through insulations 16 in the top of the casing, and are provided with set screws 17. The upper wall of the casing adjacent opposite sides thereof is provided with binding posts 18 and 19 having set screws 20, and extending through insulations 21. The binding posts 15 and 19 constitute supporting means for one end of the electrode 13 and one set of links 30. However, the wires 127 and 132 may be connected to the binding posts 15 and 19, if desired, instead of connecting them to the binding posts 14 and 18, and vice versa. To the lower ends of the binding posts 18 and 19 coupled links 22 are connected. Guided in the partition 3 and one end of the casing, and protruding through the elevator car or cage are the push bolts or rods 23 and 24. Secured to the push rods or bolts by means of the pins 25 are electrode members 26 and 27 there being insulations 28 between said members 26 and 27 and the rods or bolts. The adjacent ends of the electrode members 26 and 27 have link connections 29, while the outer ends of said members 26 and 27 are connected to the links 22, by the coupled links 30, thereby affording flexible connections between the electrode members 26 and 27 and the binding posts 18 and 19, so that the members 26 and 27 may be moved with the push rods or bolts, and at the same time form electrical connections between said binding posts 18 and 19. As shown clearly in Figs. 3, 4 and 8 the push rods or bolts 23 and 24 are provided with transverse pins 31, with which the washers 32 engage. Between the washers 32 and the partition or wall 3 and surrounding the push bolts or rods are coil springs 33, normally acting to hold the push bolts or rods in such positions as to mantain contact between the electrode members 26 and 27 and the electrode members 4, 5 and 6. Also extending transversely of the push bolts or rods 23 and 24 are pins 35, with which the washers 36 engage. Slidable upon the end portions 37 of the push bolts or rods 23 and 24 are collars 38 and 39, to which the links 40 and 41 are connected. The links 40 are arranged in pairs, as are also the links 41. However, the free ends of the links of each pair of links 40 are joined, and are connected to one end of the transverse pin 42, while the jointed ends of the links of each pair 41 are connected to one end of the pin 43. The pins 42 and 43 are provided with rollers 44 and 45, one being between the joined ends of the links of both sets thereof. Projecting from the inner face of the front wall of the casing and extending inwardly and angularly are the arms 46 and 47 having slots 48 and 49, in which the free ends of the pins 42 and 43 are guided. Arranged on the push bolts or rods 23 and 24 are coil springs 50 and 51, which are interposed between the washers 36 and the rectangular collars 38 and 39. It is to be seen that the links 40 and 41 are connected to the collars 38 and 39 by the pins 52, which pass through the collars at right angles to the push rods or bolts 23 and 24, in such a manner as not to interfere with the action of said bolts or rods. Pivoted upon the pins 54 and 55 of the bearings 56, which are carried by the partition 3, are controlling levers 56ª and 57, each of which, as shown in Fig. 11 consists of two bars 58, between the free ends of which the usual hand grip 59 is secured. Secured to the bars by the rivets or bolts 60 of both levers 56 and 57 are cam plates 61 and 62, which are of a contour to conform to the curvature of the front wall of the casing, and are designed to cam against the rollers 44 and 45 of the pins 42 and 43, that is, when said levers 56 and 57 are thrown or moved so that the curved plates 64 and 65 will cover the numbered plates 66 and 67, thereby moving the pins 42 and 43 toward the inner ends of the slots in the members or arms 46 and 47, in order to move the collars 38 and 39 in engagement with the springs 50 and 51. It is to be noted that the levers 56 and 57 move in slots 68 in the front wall of the casing. The casing is bolted to the wall of the elevator car or cage, by means of the bolts 69. Fixed to the wall of the shaft in which the elevator car or cage travels, one adjacent each floor or landing are plates or blocks 70, by means of the bolts 71. Guided in an opening 72 of each block or plate 70 is a push member 73, the head 74 thereof operating in a recess 75. Pivoted by a pin 76 to the end of the push member 73 is a cam buffer plate 77. The adjacent faces of the block 70 and the cam buffer plate 77 are provided with lugs 78, which are engaged by the coil springs 79. In Fig. 1, it is to be noted that the casing 1 is constructed to accommodate four controlling levers, there being one for each floor of a four story building, and the plates 66 and 67 are numbered corresponding to said floors or landings, for instance one, two, three and four. However, the controlling box or casing may be constructed to accommodate a greater or less number of controlling levers and their coöperating parts, so that the controlling mechanism may be used on an elevator of a larger or smaller building. As shown in Fig. 15 the controller box or casing has its binding posts connected to the leads or wires to the electric circuit, for controlling the operating means of the elevator car. In practice the installation of the mechanism is designed to be substantially as shown and described. Therefore, if it is desired that the elevator car, upon ascending, should be stopped at the second and third floors, the controlling levers having the cover plates (which cover the numerals "two and three") are respectively pulled downwardly, thereby uncovering said numerals "two and three", which discloses the fact that the car is to be stopped at said floors. Previous to operating said levers, it is assumed that the car is at the first floor, therefore the lever having the plate (which covers the numeral "one") is down, and the numeral "one" is uncovered. After actuating the levers corresponding to the second and third floors, the lever corresponding to the first floor is pushed upwardly, in order to cover the numeral "one", as a result of which the elevator car will start to ascend. Referring to the drawings it will be seen that when the electrodes 26 and 27 are in contact with the electrodes 4, 5 and 6 an electric circuit for actuating electromagnet controlled valves, which in turn operates the operating mechanism of the elevator car, is closed. In this case if either one of the electrodes 26 and 27 are out of contact with the electrodes 4, 5 and 6, the electro-magnet controlled valves or other elevator car operating mechanism is out of operation, owing to the circuit being broken, which is the case when the elevator car is at the first floor and the lever corresponding to the first floor is in its downward position. For instance, when the car is at the first floor a buffer cam 77 is in contact with the push rod or bolt 23 corresponding to the lever for the first floor, and owing to the lever 56 being down, as in Fig. 4, the cam plates 61 are so moved that the collar 38 of the push rod or bolt 23 is out of contact with the spring 50, and the combined tension strength of the springs 79 being greater than and overcoming the tension strength of the spring 33, the push rod or bolt 23 is so held, that its electrode 27 is out of contact with the electrodes 5 and 6. Hence, after having moved or lowered the levers corresponding to floors 2 and 3, and pushing upwardly on lever corresponding to the first floor, it will be seen that the combined tension strength of the springs 33 and 50 will overcome the combined tension strength of the springs 79, therefore moving the push rod or bolt 23 so that its electrode 27 will contact with the electrodes 5 and 6, thereby establishing a circuit, which will actuate the electro-magnet controlled valves of the elevator car operating means, which will result in the starting of the elevator car or cage. As previously stated the levers corresponding to the floors "two and three" have been pulled down, but until the car reaches either the second or third floors, the tension strength of the spring 34 is sufficient to hold the electrode 26 in contact with the electrodes 4 and 5, still maintaining the circuit to actuate said valves of the car operating mechanism. However, just so soon as the elevator car reaches either the second or third floors, where a buffer cam 77 is located, said cam will be contacted with by the push rod or bolt 24, and as previously stated being that the springs 79 combined are of greater strength than the spring 34, the electrode 26 will be moved out of contact with the electrodes 4 and 5, thereby breaking the circuit and deënergizing the electro-magnet of the valves of the car operating means, in which case the car will stop at the floor which corresponds with the lever which has been pulled down. A passenger or employee of a packing house or similar firm upon entering the elevator car will readily observe what floor the car is to be stopped at, upon continuing on its ascension. In case an operator or conductor is used on the elevator car, the controlling box discloses the next floor for the car to stop. While the car is stopped at either the second or third floor, the circuit is broken, and is not closed until the lever corresponding to the second or third floor is pushed upwardly, thereby causing combined strength of the springs 34 and 50 to overcome the springs 79, and pushing the push rod or bolt 24, so that the electrode 26 will contact with the electrodes 4 and 5. However, just so soon as this happens, as a result of pushing the lever corresponding to the second or third floor upwardly, the car continues upon its upward movement. By this form of mechanism for controlling an elevator car, the operator thereof may handle the freight thereon and arrange the freight to be put off at the respective floors. When the circuit, which actuates the electro-magnet controlled valves to operate the operating mechanism of the elevator car, is broken, another circuit is established, which acts as a safety brake for the controlling mechanism, owing to one or the other of said electrodes 26 and 27 contacting with said electrode 13. This improved controlling mechanism is also applicable to tramway apparatus, endless carriers, endless belt conveyers, or horizontal or inclined belt elevators and the like, and also can be adapted for use in connection with block signal systems of railways, whereby a car may be automatically stopped at the desired station. As shown in Fig. 15 a wooden block 100 is secured to the side wall of the car or cage 2, the wall of which is provided with a plurality of openings 101 arranged at spaced intervals, and arranged in openings 102 (which are in registration with the openings 101) of the wooden block are steel sleeves or bushings 103, in which the stems 104, 105, 106, 107ª and 107 of the wheel holders 108 are mounted. Journaled in the forks of the holders are the grooved wheels 109, 110, 111, 112 and 113. Held in position by the pins 114 are washers 115, between which and the wooden block the coil springs 116 (which are coiled about the stems of the wheel holders and which extend through the openings 101) are interposed, thereby acting to hold the grooved wheels 109 to 113 inclusive in contact with the conductor rods or wires 117, 118, 119, 120 and 121.

The rods or wires 117 to 121, inclusive, are designed to be arranged adjacent one of the walls of the elevator shaft, with their upper ends connected to suitable posts, (not shown), so that said wires are not directly electrically connected. The lower end of each wire 117 to 121, inclusive, is connected to a suitable post (not shown) at the lower end of the elevator shaft. These rods or wires are arranged in parallelism, and drawn tight, so that the terminal grooved wheels 109 to 113, inclusive, will travel thereon. The rods or wires 120 and 121 are designed to be connected to any suitable source of supply (not shown) by the leads or wires 170 and 171. The wire or rod 117 is connected by a wire or lead 172 to the electromagnet 173, while the rod or wire 119 is connected by a lead or wire 174 to the electromagnet 175. The electromagnets 173 and 175 are connected by the wire or lead 176. The rod or wire 118, and the wire or lead 176 are connected to any suitable source of supply by the wires or leads 177 and 178. A suitable conduit 179 is provided for conveying the fluid to any suitable hydraulic mechanism (not shown), for operating the elevator cage or car. This conduit 179 is in communication with a branch conduit or pipe 180. These conduits or pipes are provided with interior walls 181, which have ports or openings 182 and 183, respectively with which the feed and release valves 184 and 185 coöperate. The valve 184, when open, allows the fluid to pass through the conduit 179, to operate the hydraulic mechanism (not shown) to impart movement to the cage or car upwardly. However, when the valve 184 is closed, and the valve 185 open, the fluid will be released to permit the car or cage to descend. The electromagnets 173 and 175 are provided with cores 186 and 187, which in turn are connected to the valve stems 188 and 189, so that when said electromagnets are energized, the cores will be sucked into said magnets, thereby operating the valves.

The stems 104 to 107 inclusive are provided with binding screws 122, for connecting the wires or leads 123, 124, 125, 126 and 127 to the stems. The lead or wire 123 connects to a suitable binding post 128 of the switch 129. The lead or wire 124 is connected to the binding post 9 by the set screw 11, that is, of the casing of the control box. The wire or lead 125 is connected to a binding post 130 of the switch 129. The lead or wire 126 is connected to one pole of an electro-magnet 131, to the other pole of which a lead or wire 132 is connected, and which lead or wire in turn is connected to the binding post 14 of the control box. The electro-magnet 131 is provided for the purpose of releasing the doors of the elevator shaft, as hereinafter set forth. The lead or wire 127 is connected to the binding post 18 by one of the set screws 20.

The ascension operation of the car is as follows:—Current passes over the wire 177, over the rod 118, to and over the wire 124, through the medium of the groove wheel 10 and the stem 105, to the binding post 9, thence, over the electrodes 4, 5, 6, 26 and 27, to the wire or lead 137, over the switch 136, and then to the stem 106 and the wheel 111, by way of the contact 130 and the wire 125, and then over the rod 119, to and energizing the magnet 175, by way of lead or wire 174, the circuit being then completed back to the source of supply over the wire or lead 178. When the magnet 175 is energized, the valve 184 is opened, thereby permitting the fluid to pass to and operate the hydraulic mechanism, (not shown) for causing the car or cage to ascend. Therefore, it will be seen that should the lever 57 in Fig. 2 be pulled down to such a position as assumed by the lever 58 in Fig. 4, thereby uncovering the numeral three (which represents the third floor,) the cam buffer plate 77 when the car or cage reaches the third floor, will cam against and operate the rod or bolt 24, owing to the springs 79 being of greater tension than the spring 34, thereby disconnecting the electrode 26 from contact with the electrodes 4 and 5, thereby breaking the circuit, and stopping the car. Just as soon as the car stops, current is picked up from the rod 121, which passes over the lead or wire 127 to the binding post 18 over the links 30 to the electrode member 13, to the binding post 14 and thence over the lead or wire 132 to the electro-magnet 131, thereby operating the door mechanism, and thence over the lead or wire 126 to the stem 107ª back to the rod 120 and thence to the source of supply. When the magnet 131 is energized, it attracts the armature 139, thereby causing the spring tensioned dog 140 to pull downwardly on the spring tensioned bolt 141 (which is mounted in the bracket 142, to be located any suitable place, whereby the door 143 may open and close) so as to remove it from the path of the arm 144, which is carried by the door. When the bolt 141 is removed from the path of the arm 144, the weight 145 suspended from a cable 146, which passes over a pulley 147 and is in turn connected to the door, opens the door. When the car or cage is to again ascend, the door may be closed manually. When the armature 139 is attracted and the dog 140 pulls the bolt 141 downwardly, a roller cam 148 cams against the inclined part 149 of the dog 144, thereby disengaging the shoulder 150 of the dog from the shoulder 151 of the bolt, against the tension of the spring of said dog, thereby permitting the bolt 141 to return to its normal position through the action of its spring 152. When the door is closed manually, the inclined part of the arm 144 rides over the upper end of the bolt 141. To cause the car or cage of the elevator to descend, the switch or blade 136 is moved to contact with the terminal or contact 128. In this case, current passes over the line wire 177 from any suitable source, over the rod 118 to the binding post 9, by way of the grooved wheel 110, the stem 105 and the wire 124, and thence over the electrodes 4, 5, 6, 26 and 27 to the switch blade 136 by means of the wire or lead 137, thence over the wire 123 to the electromagnet 173, by way of the stem 104 and the rod 117 and wire 172, thereby energizing the magnet 173, said circuit being completed with the source of supply (not shown) over the wire or lead 178. When the electromagnet 173 is energized, the valve 185 is opened, thereby releasing the fluid from the hydraulic mechanism (not shown), allowing the car or cage to descend.

In Fig. 17, when the car is ascending, current comes in on line 177, travels the same course as in Fig. 15, and coming to the magnet 175 over the rod 119 and the wire 174, energizing the magnet 175, thereby sucking one end of the core 175ª toward the left, oscillating the switch lever 175ᵇ to the left, so that it will engage the contact 175ᶜ. The circuit, when the car is descending, comes in on the line 177, takes the usual course over the rod 118, and through the control box, and entering the magnet 173, by returning from the switch 129, over the wire 123, over the rod 117, hence, energizing said magnet 173, thereby sucking the core 175ª to the right, moving the switch lever 175ᵇ to contact with the contact point 175ᵈ, thereby causing the elevator car or cage to descend.

When the cage or car is stopped at a landing or floor, the lever 175ᵇ is in contact with the contact 175ᵉ, in fact, in neutral position, hence, the circuits over the rods 117 to 119, inclusive, are eliminated, in which case, the circuits over the rods 120 and 121 are established to energize the magnet 131. The central portion of the core 175ª is provided with a piece of insulation 175ᵏ, thereby insulating the opposite ends of the core from each other. The springs 175ʰ hold the lever 175ᵇ in neutral position in contact with the contact 175ᵉ. The particular form of switch shown in Fig. 17 is merely conventional construction, generally used, and hence, does not form any part of the invention, but is merely illustrated to show how said magnets may be employed to actuate an electric switch of an electrically operated elevator, instead of a hydraulic elevator.

The invention having been set forth, what is claimed as new and useful is:

1. In combination with a movable body having a guide therefor, of a controlling device on said body in circuit with the controlling mechanism for the body, said controlling device having a multiple of stationary contacts and provided with a multiple of movable switch members having contacts to cooperate with the stationary contacts, said switch members being under double tension, means to be actuated to reduce the double tension substantially to one half of any one of the switch members, and a device on the guide to actuate the switch member and overcome the remaining half tension of the switch member, thereby breaking the circuit and stopping the movable body at a predetermined point on the guide.

2. In combination with a movable body having a guide therefor, an electrical multiple switch controlling device in circuit with the controlling means of the movable body, holding means for said switches, means for partially releasing any one of the multiple of switches, and a device on the guide to actuate the partially released switch member, to stop the body at a predetermined point on the guide.

3. In combination with a movable body having a guide therefor, an electrical controlling device on the body and in circuit with the controlling means of the movable body and having a multiple of switch members, yieldable holding means therefor, means for partially releasing the holding means of any one of the switch members, and means on the guide to contact with said switch member to overcome the remainder of the holding means and actuate the switch member to break the circuit and stop the body.

4. In combination with a movable body having a guide therefor, an electrical controlling device on the body and in circuit with the controlling means of the movable body and having a multiple of switch members, yieldable holding means therefor, means for partially releasing the holding means of any one of the switch members, and buffer cams on the guide, any one of which to contact with one of said switch members to overcome the remainder of the holding means and actuate the switch member to break the circuit and stop the body.

5. In combination with a movable body having a guide therefor, an electrical controlling device on the body and in circuit with the controlling means of the movable body and having a multiple of push rods, yieldable holding means therefor, means for partially releasing the holding means of any one of said push rods, and means on the guide to contact with said push rod to overcome the remainder of the holding means and actuating the push rod to break the circuit and stop the body.

6. In combination with a movable body having a guide therefor, an electrical controlling device on the body and in circuit with the controlling means of the movable body and having a multiple of push bolts, yieldable holding means therefor, means for partially releasing the holding means of any one of said push bolts, and buffer cams on said guide to contact with said push bolts to overcome the remainder of the holding means and actuating the push bolts to break the circuit and stop the body.

7. In combination with a movable body having a guide therefor, an electrical controlling device on the body and in circuit with the controlling means of the movable body and having a multiple of switch members, yieldable holding means therefor, controlling levers having devices, each in the path of said holding means and adapted to be actuated to pull the devices from the path of the holding means thereby partially releasing the holding means of any one of said switch members, and means on the guide to contact with the switch member, the holding means of which is partially released for overcoming the remainder of the holding means and actuating the switch member to break the circuit and stop the body.

8. In combination with a movable body having a guide therefor, an electrical multiple switch controlling device in circuit with the controlling means of the movable body, said device having a multiple of stationary contacts in circuit with said controlling means, said mechanism including a multiple of switch members having contacts carried thereby, tensioning means for said switch members to hold their contacts in coöperation with said stationary contacts, means for relieving a part of said tensioning means of any one of said switch members, and means on the guide to overcome the other part of the tensioning means, for actuating said switch member to disengage its contact from two of said stationary contacts to stop the body at any predetermined point on the guide.

In testimony whereof I have signed my name to this specification in the presence of two subscribing witnesses.

FRANK FAYETTE WORTHEN.

Witnesses:
   ARTHUR E. HALE,
   WALTER S. COLE.